No. 849,523. PATENTED APR. 9, 1907.
J. E. ARNOLD.
REVERSING VALVE MECHANISM.
APPLICATION FILED DEC. 4, 1905.
2 SHEETS—SHEET 1.
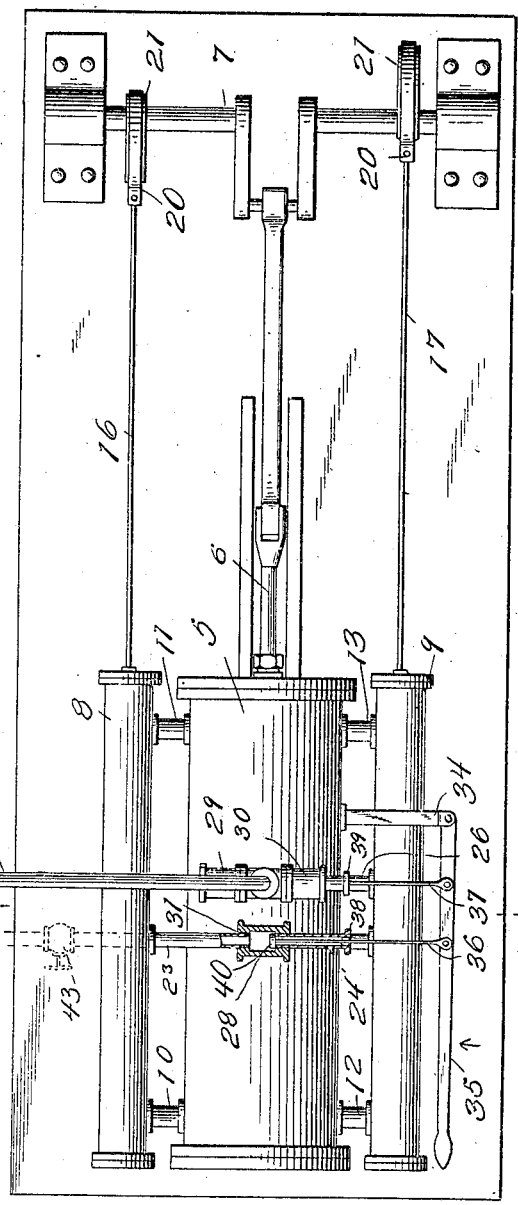
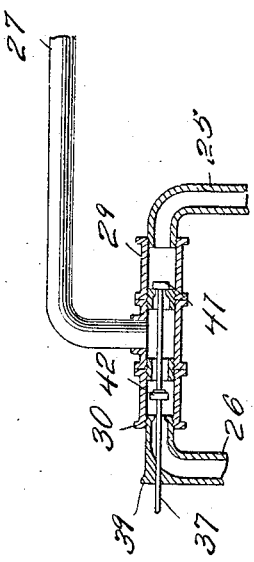
Witnesses
G. R. Thomas
F. C. Jones
Inventor
J. E. Arnold
By 
Attorneys No. 849,523. PATENTED APR. 9, 1907.
J. E. ARNOLD.
REVERSING VALVE MECHANISM.
APPLICATION FILED DEC. 4, 1905.
2 SHEETS—SHEET 2.
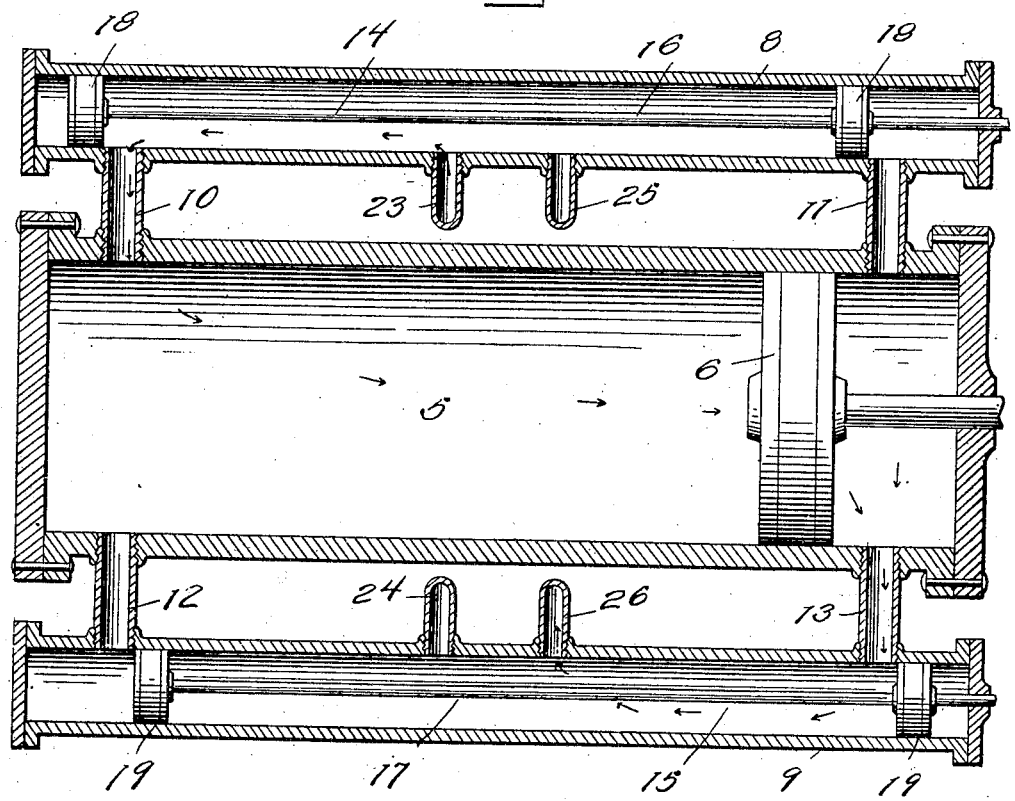
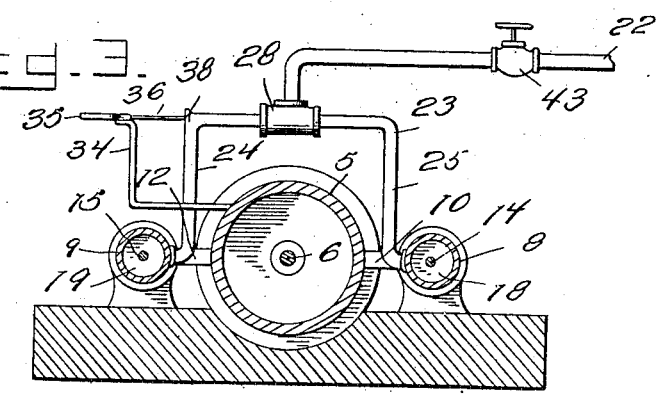
Witnesses
G. R. Thomas
F. C. Jones
Inventor
J. E. Arnold
By Chandler & Chandler
Attorneys

UNITED STATES PATENT OFFICE.

JAMES E. ARNOLD, OF GRAND VIEW, INDIANA.

REVERSING VALVE MECHANISM.

No. 849,523.	Specification of Letters Patent.	Patented April 9, 1907.

Application filed December 4, 1905. Serial No. 290,323.

*To all whom it may concern:*

Be it known that I, JAMES E. ARNOLD, a citizen of the United States, residing at Grand View, in the county of Spencer, State of Indiana, have invented certain new and useful Improvements in Reversing Valve Mechanism; and I do hereby declare the following to be a full, clear, and exact description of the invention, such as will enable others skilled in the art to which it appertains to make and use the same.

This invention relates to reversing valve mechanism for steam-engines, and has for its object to provide a valve mechanism of this nature which shall be efficient in action and which shall permit of quick reversing of the engine.

The invention resides in the provision of a novel arrangement of valves in the steam supply and exhaust pipes.

In the accompanying drawings, Figure 1 is a top plan view of an engine, showing my valve mechanism applied thereto, the steam supply and exhaust valves being shown in section. Fig. 2 is a horizontal sectional view through the cylinder and steam-chests. Fig. 3 is a section on line 3 3 of Fig. 1. Fig. 4 is a detail longitudinal section through the steam-exhaust pipe.

In the drawings, 5 denotes the engine-cylinder; 6, the piston, and 7 the main shaft which is driven by the engine.

Disposed one on each side of the cylinder 5 are steam-chests 8 and 9, which have communication therewith by means of pipes 10 and 11 and 12 and 13, respectively. Slide-valves 14 and 15 are disposed in the steam-chests 8 and 9, respectively, and comprise each valve-rods 16 and 17 and heads 18 and 19, respectively. The rods 16 and 17 are provided at their outer ends with eccentric-straps 20, in which work eccentrics 21 on the shaft 7, thereby providing for the reciprocation of the slide-valves 14 and 15 when the shaft is rotated. The heads 18 and 19 are disposed on the said rods, one adjacent each end of the steam-chest.

A steam-supply pipe 22 leads from the source of supply to the engine and is provided at its end adjacent the engine with branch pipes 23 and 24, which lead, respectively, to the steam-chests 8 and 9. Branch pipes 25 and 26 lead from the steam-chests 8 and 9, respectively, and communicate with an exhaust-pipe 27, which leads therefrom.

At the junction of the steam-supply pipe 22 and the branch pipes 23 and 24 is formed a valve-casing 28, and in the pipes 25 and 26 adjacent their connection with the pipe 27 are formed valve-casings 29 and 30. The valve-casing 28 is provided with oppositely-disposed valve-seats 31, and valve-casings 29 and 30 with single valve-seats.

Extending laterally from one side of the cylinder 5 is a bracket-arm 34, to the outer end of which is pivoted one end of a reversing-lever 35. Pivotally connected to the lever 35 at one of its ends are valve rods 36 and 37, the former extending through a stuffing-box 38 in the branch pipe 24 and the latter through a stuffing-box 39 in the branch pipe 26. A valve 40 is carried by the inner end of the valve-rod 36, which is arranged to seat at either end of the valve-casing 28. A valve 41 is carried by the end of the valve-rod 37 and works in the valve-casing 29, and disposed upon the said rod 37 and working in the valve-casing 30 is a valve 42. A throttle-valve 43 is provided at any suitable point in the steam-supply pipe 22.

As shown in the drawings, the steam-inlet is through the branch pipe 23 to the steam-chest 8, and thence through the port 10 to the cylinder 5 at the return stroke of the piston and through the pipe 11 at the forward stroke of the same. In this case the exhaust is through the ports 12 and 13, the steam-chest 9, and the branch pipe 26 to the pipe 27. By shifting the lever 35 in the direction indicated by the arrow in Fig. 1 it will be seen that the valves will be so moved as to establish the steam-inlet through the branch pipe 24, the steam-chest 9, and the pipe 12 to the engine on the return stroke of the piston and through the pipe 13 on the downward stroke of the same. The exhaust in this case is through the pipes 10 and 11.

I claim—

In a reversing valve mechanism, the combination with an engine-cylinder, steam-chests arranged at each side of said cylinder, pipes interposed between the ends of said steam-chests and said cylinder, and slide-valves in said steam-chests having heads controlling the adjacent orifices of said respective pipes, of steam-inlet pipes, a common valve-chamber having communication with said inlet-pipes, said inlet-pipes communicating with said steam-chests, steam-exhaust pipes leading from said steam-chests, a common valve-chamber communicating with said steam-exhaust pipe, valves in said respective chambers adapted to control the passage of steam through the respective inlet and exhaust pipes communicating with said chambers, a pivoted lever, and operative connections between said lever and said valves for permitting of the simultaneous movement of the latter upon actuation of said lever.

In testimony whereof I affix my signature in presence of two witnesses.

JAMES E. ARNOLD.

Witnesses:
WALTER B. MILLER,
LOUIS H. LAMAR.